United States Patent [19]

Yamamoto et al.

[11] 4,440,151

[45] Apr. 3, 1984

[54] SOLAR HEAT COLLECTOR

[75] Inventors: Takanobu Yamamoto, Katsuta; Isao Sumida; Moriaki Tsukamoto, both of Tohkai; Kazutake Imani, Katsuta; Naohisa Watahiki, Mito, all of Japan

[73] Assignees: Hitachi, Ltd.; Hitachi Chemical Co., Ltd., both of Tokyo, Japan

[21] Appl. No.: 335,542

[22] Filed: Dec. 29, 1981

[30] Foreign Application Priority Data

Dec. 29, 1980 [JP] Japan ................. 55-188491

[51] Int. Cl.³ ................................. F24J 3/02
[52] U.S. Cl. ..................... 126/433; 126/443; 126/446; 126/417; 165/104.21
[58] Field of Search ............... 126/433, 443, 446, 442, 126/417; 165/104.21

[56] References Cited

U.S. PATENT DOCUMENTS

| 3,799,144 | 3/1974 | Ramsey et al. | 126/433 |
| 3,983,861 | 10/1976 | Beauchaine | 126/446 |
| 4,080,957 | 3/1978 | Bennett | 126/447 X |
| 4,291,676 | 9/1981 | Asselman et al. | 126/433 |
| 4,333,525 | 6/1982 | Ikin et al. | 126/433 X |

FOREIGN PATENT DOCUMENTS 52-55033  5/1977  Japan .................. 126/433

OTHER PUBLICATIONS

Japanese Laid-Open Utility Model Application No. 55-162081.

Primary Examiner—Larry Jones
Attorney, Agent, or Firm—Thomas E. Beall, Jr.

[57] ABSTRACT

A solar heat collector comprises an evacuated transparent pipe; a solar heat collection plate disposed in the transparent pipe; a heat pipe, disposed in the transparent pipe so as to contact with the solar heat collection plate, and containing an evaporable working liquid therein; a heat medium pipe containing a heat medium to be heated; a heat releasing member extending along the axis of the heat medium pipe and having thin fin portions extending from the axis to the inner surface of the heat medium pipe; and a cylindrical casing surrounding coaxially the heat medium pipe to provide an annular space which communicates with the heat pipe. The evaporable working liquid evaporates, receiving solar heat collected by the heat collection plate. The resultant vapor heats the heat medium through the heat medium pipe and the heat releasing member.

16 Claims, 5 Drawing Figures

4,440,151

SOLAR HEAT COLLECTOR

BACKGROUND OF THE INVENTION

This invention relates to a solar heat collector, and more particularly to improvements on the vapor condensing portion of a solar heat collector having a heat pipe and a solar heat collection plate in an evacuated transparent housing.

A solar heat collector using a heat pipe, generally, is constructed as follow: A solar heat collection plate exposed to solar rays is disposed in an evacuated transparent pipe, and contacts with the heat pipe which contains an evaporable working liquid and is connected to a heat releasing pipe. The heat releasing pipe communicates with the heat pipe and encloses a heat medium pipe so as to form an annular chamber.

In this solar heat collector, the heat collection plate heated by solar rays heats the evaporable working liquid in the heat pipe to evaporate it thereby producing vapor. The vapor rises upward in the heat pipe, reaches the annular chamber, and is cooled there by the heat medium pipe to condense. The condensate descends and its heated again.

In order to effectively use the heat collected by the heat collection plate, it is necessary to absorb sufficiently the heat of the vapor. Therefore, various means for absorbing the vapor heat are proposed, one of which is desclosed in Japanese Laid-open Utility Model Application No. 55-162061 in which a part of a heat medium pipe is corrugated to provide a large surface contacting with the vapor and heat medium. The heat medium pipe with such a corrugated surface is improved on heat transfer between the vapor and the heat medium, as compared with a flat pipe.

It is desired, however, to further improve the heat transfer without making the scale larger. The heat medium pipe disclosed in the abovementioned Application seems to reduce the cross-sectional area of the passage for allowing the heat medium to flow by the corrugations. Therefore, it seems to prevent the whole construction from reducing the scale.

SUMMARY OF THE INVENTION

An object of the invention is to provide a solar heat collector which can evaporate easily an evaporate working liquid in a heat pipe and condense rapidly the resultant vapor without making a construction for condensing the vapor large.

Another object of the invention is to provide a solar heat collector whih has a vapor condensing section of an excellent heat transfer characteristic and which can reduce the scale of the condensing section.

Briefly stated, the invention consists in that in a heat medium pipe of the condensing section of a solar heat collector, heat releasing means is provided which extends in the longitudinal direction and has a plurality of fin portions extending from the inner face to around the axis portion of the heat medium pipe, whereby heat of vapor surrounding the heat medium pipe is transmitted effectively to a heat medium in the heat medium pipe through heat conduction of the heat medium pipe and heat-conductive means.

DESCRIPTION OF THE PREFERRED EMBODIMENTS

Figure 1:
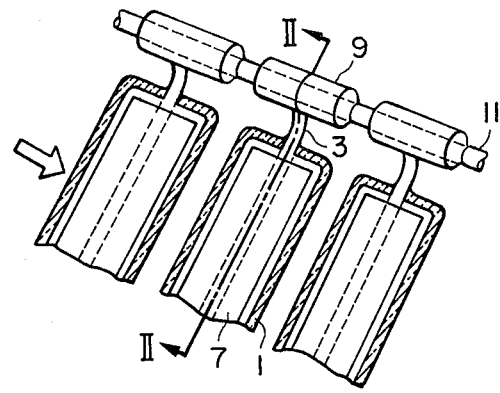
FIG. 1 is a sectional view of an embodiment of a solar heat collector according to the invention.
Figure 2:
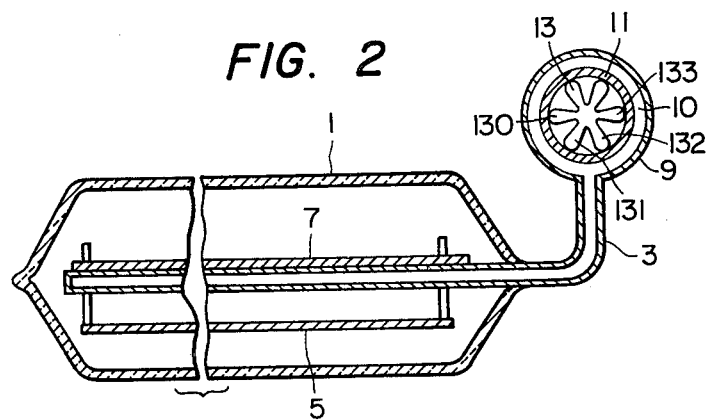
FIG. 2 is a sectional view of the solar heat collector taken along a line II—II of FIG. 1.

Referring to FIGS. 1 and 2, an embodiment of a solar heat collector according to the invention will be described hereinafter in detail.

In FIG. 1, the solar heat collector comprises a heat collection section exposed to solar rays (shown by an arrow) and a condensing section. Referring to FIG. 2, in the heat collection section there is an evacuated transparent pipe 1 of glass. In the evacuated transparent pipe 1, a heat pipe 3 is disposed along the axis of the pipe 1. The heat pipe is made of heat-conductive material such as copper and contains an evaporable working liquid such as Freon R-113. The heat pipe 3 is fixed to a supporter 5 fitted in the evacuated transparent pipe 1 and one end portion thereof projects out of the pipe 1 therefrom. A heat collection plate 7 is disposed in the pipe 1 so as to contact with the heat pipe 3. In the condensing section, there is provided a cylindrical casing 9 which is joined to the heat pipe 3. The cylindrical casing 9 is closed at both ends in the longitudinal direction. A heat medium pipe 11 is disposed coaxially in the cylindrical casing 9, and supported by the end portions of the casing 9 so that a closed annular chamber 10 is formed. The chamber 10 surrounds the casing 9 and communicates with the heat pipe 3. In the interior of the heat medium pipe 11, there is rigidly inserted a heat releasing member 13 which extends along the axis of the heat medium pipe 11 and has a plurality of, preferably six, hollow projections 130. The hollow projections 130 extend radially from the inner face to around the axis portion of the heat medium pipe 11 by more than about two thirds the radius of the pipe 11. Each of the hollow projections 130 comprises a pair of thin fin portions 131 joined to each other at the tips, and divides the interior of the heat medium pipe 11 into a plurality of compartments 132, 133. The area of a compartment 132 defined by one of the hollow projections 130 is approximately equal to the area 133 defined by two immediately adjacent projections 130. The heat releasing member 13 is made of a thin plate of heat conductive material such as copper and has twelve round portions so that there is no extremely narrow portion where medium flow is prevented thereby.

A plurality of evacuated pipes 1, heat collection plates 7, heat pipes 3, and cylindrical casings 9 are provided, and the cylindrical casings 9 are axially arranged and mounted on the heat medium pipe 11, as shown in FIG. 1.

In this construction, the heat collection plate 7 directed to the solar rays receives solar heat. The heat is transmitted to the working liquid in the heat pipe 3 through heat conduction to evaporate it. The resultant vapor of the working liquid rises in the heat pipe 3 and reaches the annular chamber 10. The vapor is cooled there by the heat medium pipe 11 to condense. At the same time, the heat medium such as water in the heat medium pipe 11 is heated by heat of the vapor and the resultant condensate surrounding the heat medium pipe 11 through the wall of the heat medium pipe 11 and the heat releasing member 13. Thus, the heat exchange between the working liquid vapor and the heat medium is effected. The condensate flows down and it is subjected to evaporation repeatedly.

The heat medium pipe 11 is provided with the plurality of thin fin portions extending radially toward the axis portion. The thin fin portions are more crowded around the axis than near the inner face of the heat medium pipe 11. Therefore, the thin fin portions make relatively even heat distribution in the heat medium pipe 11, and reduce little the sectional area of the heat medium pipe 11. Therefore, the heat transfer characteristic is remarkably improved. The heat medium pipe 11, further, does not have any fins on the outer surface, so that the chamber surrounding the heat medium pipe 11 can be reduced without restricting the evaporation of the working liquid.

Figure 3:
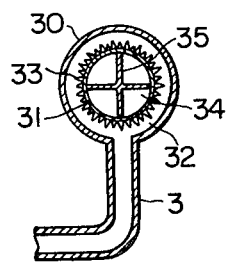
FIG. 3 is a sectional view of another embodiment of a condensation section of a solar heat collector according to the invention.
Figure 4:
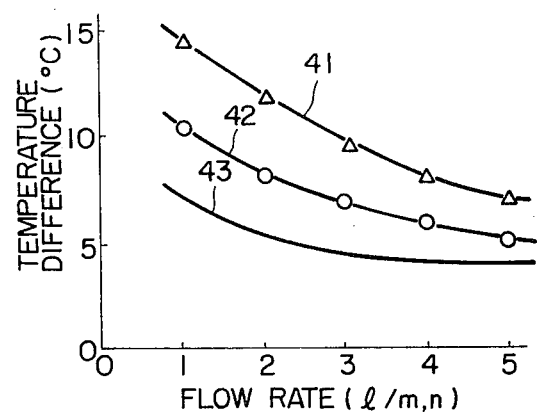
FIG. 4 is a graph showing relations between flow rate in heat medium pipes and temperature difference between the inside and the outside of the heat medium pipes.

The effect of heat transfer of the heat medium pipe 11 with the heat releasing member 13 is expressed in FIG. 4, wherein an abscissa expresses flow rate (l/min.) of water (temperature of 85° C.) flowing in heat medium receiving thermal input of 140 W from the outside; an ordinate, temperature difference between the outside and the inside of the heat medium pipe 11; and numerals 41, 42 and 43 denotes the temperature difference-flow rate characteristic curves of a pipe without any heat releasing member, a pipe with a heat releasing member of crossed fins shown by numeral 35 of FIG. 3, and the pipe 11 with the heat releasing member 13, respectively.

It is noted from FIG. 4 that the heat transfer effect is very great in the use of the heat medium pipe 11 with heat releasing member 13.

In stead of the heat releasing member 13, separated fin members axially and radially extending can be provided in the inner face of the heat medium pipe 11.

Another embodiment of a solar heat collector according to the invention will be described hereinafter referring to FIG. 3.

In FIG. 3, the header portion of the heat pipe 3 includes a cylindrical casing 30 and a heat medium pipe 31. The heat medium pipe 31 has a saw-toothed outer surface which has a plurality of conical projections or saw-toothed fin 33, and a fin 35 inserted therein. The fin 35 has a crossed sectional shape defined by four thin plates extending radially from the central portion and extends in the longitudinal direction. The heat medium pipe 31 is divided into four compartments by the fin 35.

Figure 5:
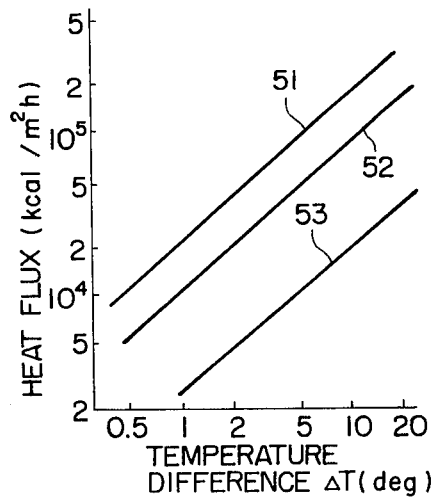
FIG. 5 is a graph showing relations between temperature difference and heat flux using heat medium pipes hving various outer surface configurations.

Since the present embodiment has the construction thus far described, the heat transfer between the working fluid 32 and the heat medium 34 is so improved as will be described in the following. The condensation heat transfer illustrated in FIG. 5, wherein characteristic curves 51, 52 and 53 express the pipe 30 with the saw-toothed fins 33, a pipe with disc-like fins, and a flat pipe, respectively, is attained by using Freon R-113 as the working liquid at a condensation temperature of 50° C. and under a pressure of 1.1 kg/cm². According to this experimental result, the saw-toothed fins 33 have a heat transfer about twice as high as that of the disc-shaped fins. On the other hand, in case the cross-shaped fins are mounted in the heat medium pipe 31, it can be easily confirmed that a heat transfer coefficient about twice as high as that of the case in which the heat medium pipe 31 has none of the cross-shaped fins 35. According to the present invention, therefore, a heat transfer coefficient about four times as high as that of the prior art can be obtained. Moreover, similar effects can be attained even if the fins 35 are made to have a shape of a letter "S" or a fylfot.

Although the embodiment thus far described is directed to the case in which the saw-toothed fins and the cross-shaped fins are used in combination. It is apparent that a combination of the saw-toothed fins and the heat releasing member 13 is more improved on the heat transfer characteristics.

According to the present invention, since the heat transfer characteristics are remarkably improved, it is possible to curtail the length of the cylindrical casing portion, and as a result, it becomes possible to reduce the size of the heat exchange portion.

What is claimed is:

1. A solar heat collector comprising:
   a solar heat collection section having an evacuated transparent housing,
   a heat collection plate, disposed in said evacuated transparent housing, for receiving solar heat, and
   a heat pipe disposed in said housing to receive heat from said heat collection plate and containing an evaporative working liquid therein to be evaporated by the solar heat
   a condensation section having
   an axially extending heat medium pipe for containing heat medium pipe for containing heat fluid medium to be heated,
   heat releasing means of heat-conductive material provided in said heat medium pipe, said heat releasing means extending in the axial direction of said heat medium pipe and having a plurality of thin fin portions, each extending radially from contact with the inner face of said heat medium pipe to about the axis of said heat medium pipe and each extending in the axial direction of said heat medium pipe to form a plurality of peripherally spaced axially extending compartments along the heat medium tube for unobstructed axial passage of said heat fluid medium, and
   a casing communicating with said heat pipe and surrounding coaxially said heat medium pipe with an annular space therebetween containing the vapor and condensate of said working liquid in contact with the outer face of said heat medium pipe, so that heat exchange between the vapor and condensate of said working liquid in said casing and the heat fluid medium in said heat medium pipe is effected through said heat medium pipe and said heat realeasing means.

2. The solar heat collector as defined in claim 1, wherein immediately adjacent each two of said thin fin portions of said heat-releasing means are joined around the axis portion of said heat medium pipe thereby to provide the plurality of compartments defined by said fin portions and parts of said heat medium pipe wall.

3. The solar heat collector as defined in claim 2, wherein the cross-sectional area of one of said compartments is nearly equal to another adjacent thereof.

4. The solar heat collector as defined in claim 2, wherein said heat medium pipe has a saw-toothed outer surface which has a plurality of projections.

5. The solar heat collector as defined in claim 4, wherein said thin fin portions are arranged to be crossed.

6. A solar heat collector as defined in claim 1, wherein each of said heat medium pipes and said casing are cylindrical; said heat releasing means having said thin fin portions, as seen in cross section perpendicular to the axis of said cylindrical heat medium pipe, continuously joined together in a convoluted loop consisting of the outwardly opening generally U-shaped fin portions having outwardly flared ends of the U-shape joined to the respective adjacent ends, the adjacent fin portions in contact with the inner surface of said heat medium pipe.

7. The solar heat collector as defined in claim 6, wherein the cross sectional area of the compartments formed between each fin portion and the interior surface of said heat medium pipe is about the area of the compartments formed between adjacent fin portions, and said fin portions each extend inwardly from the inner surface of said heat medium pipe for more than two-thirds the inner radius of said heat medium pipe.

8. The solar heat collector as defined in claim 1, wherein said heat medium pipe and said casing are each cylindrical and are concentric with respect to each other; said heat releasing means consisting of two thin fin portions, in cross section perpendicular to the axis of said cylindrical heat medium pipe, being two plates perpendicular to each other and each extending from contact with the inner surface of said heat medium pipe diametrically across said heat medium pipe to contact the diametrically opposite inner surface of said heat medium pipe.

9. The solar heat collector as defined in claim 8, further including additional heat releasing means being a saw-tooth outer surface configuration of said heat medium pipe and an inner smooth cylindrical surface of said heat medium pipe.

10. A solar heat collector comprising:
a solar heat collection section having heat collection plates for receiving solar heat,
a plurality of heat collection plates for receiving solar heat, contact with each of said heat collection plates, respectively, and contains an evaporative working liquid to be evaporated by the solar heat, and
a plurality of evacuated transparent housings for enclosing said heat collector plates and partially said heat pipes respectively; and
a condensation section having
a heat medium pipe made of heat-conductive material and containing heat medium therein,
a heat-conductive member inserted in said heat medium pipe and extending in the axial direction of said heat medium pipe, said member having such a configuration in cross-section that a plurality of fin portions extend near the axis of said heat medium pipe, each of said fin portions extending radially from contact with the inner face of said heat medium pipe to about the axis of said heat medium pipe and each extending in the axial direction of said heat medium pipe to form a plurality of peripherally spaced axially extending compartments along the heat medium tube for unobstructed axial passage of said heat fluid medium, and
a cylindrical casing coaxially surrounding said heat medium pipe to provide a closed annular chamber fluid communicating with said heat pipes.

11. A solar heat collector as defined in claim 10, wherein said fin portions of said heat releasing member extend radially by at least about two third the inner radius of said heat medium pipe.

12. A solar heat collector as defined in claim 10, wherein at least said fin portions are joined to provide said compartments for passing the heat medium therethrough.

13. A solar heat collector as defined in claim 10, wherein said heat medium pipe and each of said casings are cylindrical; said heat releasing means having said thin fin portions, as seen in cross section perpendicular to the axis of said cylindrical heat medium pipe, continuously joined together in a convoluted loop consisting of the outwardly opening generally U-shaped fin portions having outwardly flared ends of the U-shape joined to the respective adjacent ends, the adjacent fin portions in contact with the inner surface of said heat medium pipe.

14. A solar heat collector as defined in claim 13, wherein the cross sectional area of the compartments formed between each fin portion and the interior surface of said heat medium pipe is about the area of the compartment formed between adjacent fin portions, and said fin portions each extend inwardly from the inner surface of said heat medium pipe for more than two-thirds the inner radius of said heat medium pipe.

15. A solar heat collector as defined in claim 10, wherein said heat medium pipe and each of said casings are each cylindrical and are concentric with respect to each other; said heat releasing means consisting of two thin fin portions, in cross section perpendicular to the axis of said cylindrical heat medium pipe, being two plates perpendicular to each other and each xtending from contact with the inner surface of said heat medium pipe diametrically across said heat medium pipe to contact the diametrically opposite inner surface of said heat medium pipe.

16. A solar heat collector as defined in claim 15, further including additional heat releasing means being a saw-tooth outer surface configuration of said heat medium pipe and an inner smooth cylindrical surface of said heat medium pipe.

* * * * *